Patented Aug. 12, 1952

2,606,931

UNITED STATES PATENT OFFICE 2,606,931

METHOD OF PREPARING NITROMALONALDEHYDE AND SALTS THEREOF

Erwin Kuh, New Brunswick, and Hugh W. Stewart, Plainfield, N. J., assignors to American Cyanamid Company, New York, N. Y., a corporation of Maine No Drawing. Application May 27, 1950, Serial No. 164,852

4 Claims. (Cl. 260—601)

This invention relates to a new method for the preparation of nitromalonaldehyde and salts thereof.

In the past nitromalonaldehyde has been prepared exclusively from alpha,beta-dibromo-beta-formylacrylic acid (mucobromic acid). Substitution for the latter of the commercially available alpha,beta-dichloro-beta-formylacrylic acid (mucochloric acid) results in the formation of very little if any nitromalonaldehyde. Mucobromic acid, although producing good yields of nitromalonaldehyde, it itself expensive to prepare, since it requires 5 mol equivalents of expensive bromine (and only one equivalent is included in the final product). The reaction from furfural to mucobromic acid is quite violent and difficult to control and an expensive bromine recovery system is required to make the procedure at all economical.

We have now found that nitromalonaldehyde can be prepared in good yields from the starting material beta-bromo-alpha-chloro-beta-formylacrylic acid (mucobromochloric acid). The mucobromochloric acid is heated in an aqueous alcoholic solution in the presence of a nitrite. The nitromalonaldehyde is readily recovered as a salt from the reaction mixture on cooling.

It should be noted that the isomeric compound, the known beta-chloro-alpha-bromo-beta-formylacrylic acid, (mucochlorobromic acid) gives much lower yields of nitromalonaldehyde than the new starting material when treated with nitrite under the same conditions. Since nitromalonaldehyde is a relatively unstable chemical, it is preferably isolated as a salt. Furthermore, because it reacts efficiently with guanidine its yields can be conveniently assayed through the reaction with guanidine to form 2-amino-5-nitropyrimidine.

The present reaction is preferably carried out at a temperature within the range of 40° C. to about 65° C. The aqueous alcoholic solution may be a mixture of water and methanol, ethanol, propanol, butanol and the like.

In the above reaction we prefer to use an alkali metal nitrite. However, we can also use an alkaline earth metal nitrite. The first product obtained is the salt of nitromalonaldehyde corresponding to the nitrite used which can be converted to nitromalonaldehyde by neutralization.

The starting material beta-bromo-alpha-chloro-beta-formylacrylic acid is a new compound which is described and claimed in a copending application, Serial Number 164,851 filed May 27, 1950, now Patent Number 2,588,852. A description of its preparation is also given in the present application.

The compound, nitromalonaldehyde, by the present process made easily accessible in any desired quantity is a valuable synthetic material. Its reactions with diamines or amidines are most significant yielding nitrated heterocyclic compounds. An example of this is the fact that nitromalonaldehyde can be reacted with guanidine to produce 2-amino-5-nitropyrimidine in good overall yields. This latter compound has recently been found to be highly active in the therapeutic and prophylactic treatment of blackhead disease in turkeys.

The following example illustrates a method of preparing mucobromochloric acid and the use of this intermediate in the preparation of nitromalonaldehyde. All parts are by weight unless otherwise indicated.

To a round-bottom flask with 5 necks containing an efficient agitator, a long reflux condenser, a dropping funnel with a long capillary stem, a sub-surface gas feed tube and a thermometer, there are charged 6 parts of hydrobromic acid 48%, 7 parts of water and 3 parts of bromine. The bromine dissolves completely in the liquid. The contents of the flask is heated to 65° C. and 4 parts of furfural added at such a rate that the steady flow through the capillary takes about 2½ hours. The furfural reacts exothermically with the bromine. The temperature is allowed to reach 70° C. and the bromine starts to reflux. As soon as the deep red color of the liquid becomes lighter, a fast current of chlorine is passed through and the temperature kept at 75°–80° C. by external cooling. The flow of furfural and chlorine should be adjusted in the ratio 1:3 by weight. When about two-fifths of the furfural is added, large quantities of hydrogen chloride together with some carbon dioxide escape through the condenser carrying some bromine vapors with them. Almost no cooling is now needed to keep the temperature at 80°–85° C. After all furfural is in, the chlorine current is cut in half and the temperature slowly raised to 95° C. When about 90% of the theoretically needed chlorine is used, it is stopped and the light yellow liquid slowly cooled to 5° C. The slurry of almost white crystals is filtered and washed with a small quantity of ice water. Yield, 90–94% of theory of mucobromochloric acid.

A solution of 484 parts of sodium nitrite in 600 parts of water and 80 parts of methanol is heated to 50° C. To this there is slowly added at 50°–55° C., with cooling, one half of a solution of 427 parts of mucobromochloric acid in 240 parts of methanol. Then there is added 300 parts of water at 50° C. The remainder of the methanol solution of mucobromochloric acid is slowly added at 50°–55° C. The reaction is stirred for one-half hour at 50°–55° C. It is then cooled to 10° C. and the yellow crystals of the sodium salt of nitromalonaldehyde are isolated by filtration, washed with cold 50% aqueous methanol, acetone and dried at room temperature. The yield is 120 parts, 43%.

Nitromalonaldehyde may be obtained from the above sodium salt by neutralization with an acid, though it is not a very stable compound in the free acidic form. When isolated as the free acidic compound, it is preferably used immediately.

We claim:

1. A method of preparing a member of the group consisting of alkali metal nitromalonaldehydes and alkaline earth metal nitromalonaldehydes which comprises heating to a temperature within the range 40° C. to 65° C. beta-bromo-alpha-chloro-beta-formylacrylic acid with a member of the group consisting of alkali metal nitrites and alkaline earth metal nitrites in the presence of an aqueous lower aliphatic alcoholic solution and recovering said compound therefrom.

2. A method of preparing a member of the group consisting of alkali metal nitromalonaldehydes and alkaline earth metal nitromalonaldehydes which comprises heating to a temperature within the range 40° C. to 65° C. beta-bromo-alpha-chloro-beta-formylacrylic acid with a member of the group consisting of alkali metal nitrites and alkaline earth metal nitrites in the presence of an aqueous lower aliphatic alcoholic solution and recovering said compound therefrom.

3. A method of preparing an alkali metal nitromalonaldehyde which comprises heating to a temperature within the range 40° C. to 65° C. beta-bromo-alpha-chloro-beta-formylacrylic acid with an alkali metal nitrite in the presence of an aqueous lower aliphatic alcoholic solution and recovering said alkali metal nitromalonaldehyde therefrom.

4. A method of preparing sodium nitromalonaldehyde which comprises heating to a temperature within the range 40° C. to 65° C. beta-bromo-alpha-chloro-beta-formylacrylic acid with sodium nitrite in an aqueous methanol solution and recovering said sodium nitromalonaldehyde therefrom.

ERWIN KUH.
HUGH W. STEWART.

REFERENCES CITED

The following references are of record in the file of this patent:

Hill et al., American Chemical Journal, vol. 22, August 1899, No. 2, pp. 89–110.